(12) United States Patent
Baumann et al.

(10) Patent No.: US 6,806,783 B2
(45) Date of Patent: Oct. 19, 2004

(54) CIRCUIT ASSEMBLY FOR GENERATING RF OSCILLATION PLUCKING PULSES

(75) Inventors: Adolf Baumann, Bundesrepublik Deutschland (DE); Harald Parzhuber, Bundesrepublik Deutschland (DE)

(73) Assignee: Texas Instruments Deutschland GmbH, Freising (DE)

( * ) Notice: Subject to any disclaimer, the term of this patent is extended or adjusted under 35 U.S.C. 154(b) by 147 days.

(21) Appl. No.: 10/081,049

(22) Filed: Feb. 20, 2002

(65) Prior Publication Data

US 2002/0119751 A1 Aug. 29, 2002

(30) Foreign Application Priority Data

Feb. 26, 2001 (DE) .......................... 101 09 203

(51) Int. Cl.[7] .............................................. H03B 1/00
(52) U.S. Cl. ..................... 331/74; 331/166; 331/117 R; 340/539; 340/825.31; 340/825.69; 455/41
(58) Field of Search ............................. 331/166, 117 R, 331/74; 340/539, 825.31, 825.69; 455/41

(56) References Cited

U.S. PATENT DOCUMENTS 5,283,529 A * 2/1994 Meier .......................... 327/596
5,621,396 A * 4/1997 Flaxl ........................... 340/10.4
6,323,566 B1 * 11/2001 Meier .......................... 307/10.2

* cited by examiner

*Primary Examiner*—Arnold Kinkead
(74) *Attorney, Agent, or Firm*—Bret J. Petersen; W. James Brady, III; Frederick J. Telecky, Jr.

(57) ABSTRACT

In a circuit assembly for generating pulses sustaining or "plucking" RF oscillations in a resonant circuit (12) of transponder (10) having no battery power supply in which the supply voltage needed for its operation is obtained from a RF carrier oscillation pulse defined in time exciting the resonant circuit into oscillation and used to charge a storage element whose charging voltage forms the supply voltage, a plucking pulse is generated every time the amplitude of the RF oscillations drops below a defined threshold value and its momentary value is in a defined relationship to a reference voltage (VPEAK) changing in time as the charging voltage of a capacitor (70). A switch (24) is provided which can be switched on for the duration of the plucking pulse (PLUCK) for connecting the storage element (20) to the resonant circuit (12). A closed control loop (34, 38) is provided which varies the slope of the reference voltage curve between two plucking (PLUCK) pulses in the direction of maintaining the predefined relationship between the momentary value of the RF oscillations and the reference voltage.

3 Claims, 4 Drawing Sheets

CIRCUIT ASSEMBLY FOR GENERATING RF OSCILLATION PLUCKING PULSES

FIELD OF THE INVENTION

The invention relates to a circuit assembly for generating pulses sustaining or "plucking" RF oscillation in a resonant circuit of a batteryless transponder in which the supply voltage needed for its operation is obtained from a RF carrier oscillation pulse defined in time exciting the resonant circuit into oscillation and used to charge a storage element whose charging voltage forms the supply voltage, in which a plucking pulse is generated every time the amplitude of the RF oscillations drops below a defined threshold value and its momentary value is in a defined relationship to a reference voltage changing in time as the charging voltage of a capacitor and wherein a switch is provided which can be switched on for the duration of the plucking pulse for connecting the storage capacitor to the resonant circuit.

BACKGROUND OF THE INVENTION

Described in EP 0 301 127 B1 is a transponder which works without a battery and whose supply voltage is obtained from a RF carrier oscillation pulse received by the transponder. Provided in the transponder is a resonant circuit whose coil simultaneously serves as an antenna for receiving the RF carrier oscillation pulse. Rectifying the received RF carrier oscillation pulse generates a DC voltage with which a storage capacitor is charged, whose charging voltage, on conclusion of the RF carrier oscillation pulse, is employed as the supply voltage for the transponder. The simplest typical application of one such transponder is its use as an identification element. In this arrangement it is configured so that at the end of the received RF carrier oscillation pulse it is in turn able to transmit an RF signal which is modulated with an ID code stored in the transponder. An interrogator is thus able to read this ID code and accordingly also able to establish the identity of items to which the transponder is secured.

Transmitting the RF signal by the transponder requires the resonant circuit contained therein to continue to oscillate after termination of the RF carrier oscillation pulse. These oscillations of the resonant circuit are used to generate clock signals in the transponder needed to modulate the RF oscillation so that this signal can then be transmitted in modulated form by the coil of the resonant circuit. Depending on the Q of the resonant circuit and further unavoidable damping factors, the oscillations excited in the resonant circuit by the RF carrier oscillation pulse decay more or less quickly aperiodically. This is why it needs to be assured in the known transponder that energy is supplied from the storage capacitor to the resonant circuit in fixed time intervals which keep the oscillation going as long as energy is still stored.

Described in DE-A-39 14 888 is a circuit assembly with the aid of which the energy supply to the resonant circuit of the transponder can be optimized. This circuit ensures that the energy supply is made to the resonant circuit in the sense of a positive feedback at each optimum point in time during a half-cycle of the RF oscillations. In a transponder of this type available commercially from Texas Instruments as TMS 3789, TMS 3791 or TMS 3792 this principle of plucking the RF oscillations in the resonant circuit of the transponder is employed in which the energy supply is made each time after a fixed number of RF cycles. It is possible to vary the setting of this number of RF cycles for the various transponders for adapting them to the various damping conditions anticipated in practical operation. This is, however, not optimal for changing damping conditions, since it may happen that when the resonant circuit is strongly damped, the energy supply for plucking the RF oscillations occurs too late to be effective or, when the damping is less, the energy supply occurs too often and thus fails to make optimum use of the energy available in the storage capacitor, it instead being wasted.

SUMMARY OF THE INVENTION

The invention is based on the object of configuring a circuit assembly of the aforementioned kind so that optimum use of the energy available in the storage element is achieved.

In accordance with the invention this object is achieved in that a closed control loop is provided which varies the slope of the reference voltage curve between two plucking pulses in the direction of maintaining the predefined relationship between the momentary value of the RF oscillations and the reference voltage.

In making use of the circuit assembly in accordance with the invention, energy is supplied to the resonant circuit as controlled by the plucking pulse not only at each correct point in time but also in adapting to each Q of the resonant circuit as dictated by the properties of the components of the resonant circuit and by the external damping effects. Energy is now supplied only when actually needed to sustain the RF oscillations, i.e. thus avoiding energy being supplied to the resonant circuit when already capable of continuing to oscillate for a certain period without this energy supply.

Advantageous aspects of the invention read from the sub-claims.

A transponder provided with the circuit assembly in accordance with the invention can be put to use in a wide variety of applications without its parameter influencing the Q of its resonant circuit needing to be changed, i.e. the circuit assembly in accordance with the invention automatically adapts to the change in the Q of the circuit which greatly expands the range of possible applications of the transponder.

BRIEF DESCRIPTION OF THE DRAWINGS

The invention will now be detailed by way of example with reference to the drawings in which.

DETAILED DESCRIPTION OF THE PREFERRED EMBODIMENTS

Figure 1:
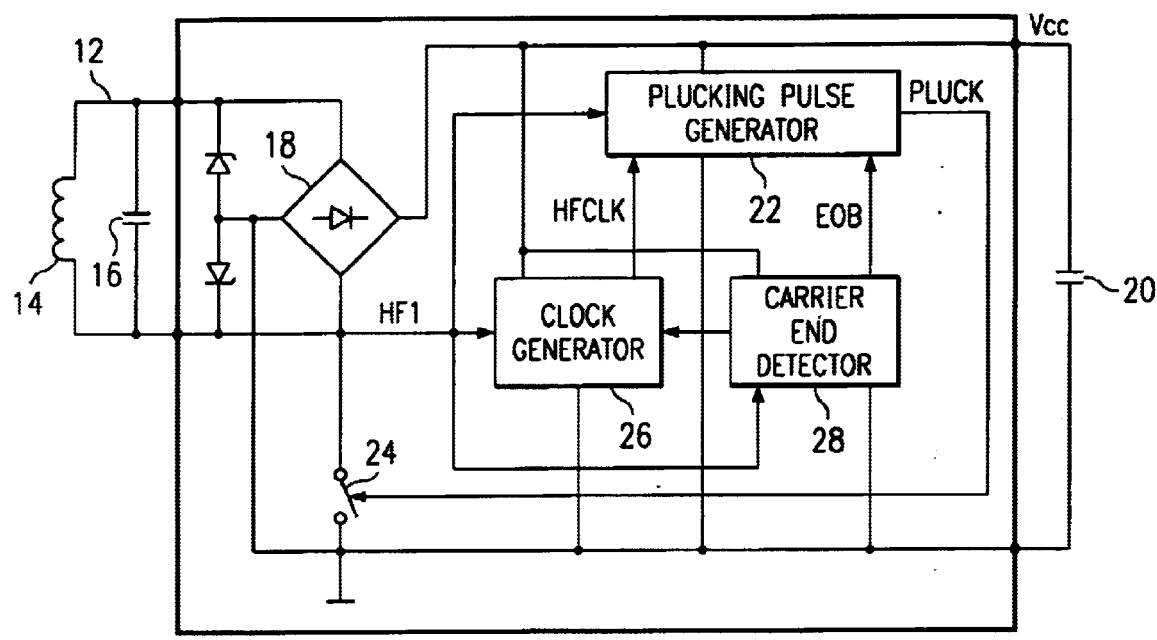
FIG. 1 is a general block diagram of a conventional transponder for application of the circuit assembly in accordance with the invention.

Referring now to FIG. 1 there is illustrated a block diagram in first discussing the basic configuration of a transponder in which the circuit assembly in accordance with the invention finds application. The transponder 10 contains a resonant circuit 12 including a coil 14 and a capacitor 16. The coil 14 of this resonant circuit 12 serves as the transponder antenna, with the aid of which the transponder is able to transmit and receive RF signals. The following description is confined to the functions in receiving RF carrier oscillation signals for rectification in producing the transponder supply voltage. Sustaining ("plucking") the oscillations of the resonant circuit on termination of the receiving the RF carrier oscillation signals is necessary for subsequent transmission of the data stored in the transponder. As regards the functions of transmitting RF signals, of less importance in understanding the invention, reference is made to the already cited EP 0 301 127 B1. To activate the transponder 10 an interrogator (not shown) sends an RF carrier oscillation signal which is received by the coil 14. The resonant circuit 12 tuned to the frequency of the RF carrier oscillation signal is thereby set in oscillation. With the aid of a rectifier 18 the RF carrier oscillation signal is rectified and the rectified voltage results in the storage capacitor 20 serving as the storage element being charged. On termination of the RF carrier oscillation signal a voltage is available at the terminals of the storage capacitor 20 which serves as the supply voltage Vcc for the modules contained in the transponder 10.

Depending on its Q the resonant circuit 12 continues to oscillate more or less longer on termination of the RF carrier oscillation signal, the amplitude of which decreases aperiodically. To lengthen the duration of oscillation of the resonant circuit 12 a signal PLUCK in the form of a spike is generated in a plucking pulse generator 22 for closing a switch 24 for its duration. Closing the switch 24 results in energy being supplied from the storage capacitor 20 to the resonant circuit for the duration of the pulse PLUCK. This results in the amplitude of the RF oscillation of the resonant circuit since having become smaller, again being elevated to a higher value from which a repeat aperiodic deterioration occurs. By repeatedly closing the switch 24 the total duration of oscillation of the resonant circuit 12 can be lengthened. Contained in the plucking pulse generator 22 are circuit modules which generate the pulse PLUCK as controlled by a clock signal HFCLK generated from the RF oscillation signal HF1 in a clock generator 26 and in taking into account each condition of the RF oscillation signal HF1. A carrier end detector 28 has simply the task of switching OFF the plucking pulse generator 22 in avoiding an unnecessary energy consumption as long as the coil 14 of the resonant circuit 12 is receiving the RF carrier oscillation signal from an interrogator. The carrier end detector 28 recognizes the end of this RF carrier oscillation signal and subsequently enables the plucking pulse generator 22 by means of an signal EOB. The signal PLUCK is generated in the plucking pulse generator 22 every time two conditions are satisfied, namely when the amplitude of the RF oscillations of the resonant circuit drop below a critical threshold value and its momentary value relates predefined to the reference voltage which changes in time in accordance with the charging curve of a capacitor.

These two conditions do not suffice, as yet, in optimally making use of the energy contained in the storage capacitor 20 to pluck the oscillations and thus to keep the resonant circuit 12 oscillating as long as possible. Due to external damping effects, the Q of the resonant circuit may be changed to such a degree that more particularly the second condition can no longer be satisfied without excessive energy supply to the resonant circuit, resulting in the available energy being used up too quickly. By modifying the configuration of the plucking pulse generator in accordance with the invention the oscillations of the resonant circuit can now be plucked longer in making optimum use of available energy.

Figure 2:
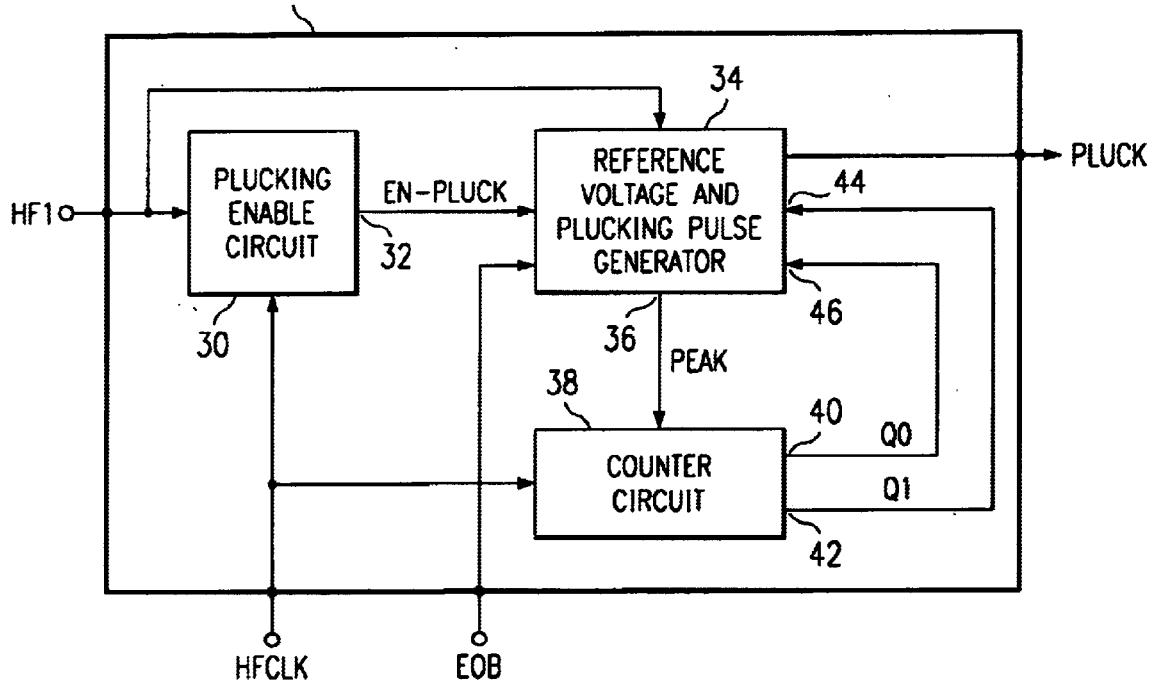
FIG. 2 is a block diagram assisting discussion of the configuration of the plucking pulse generator in accordance with the invention.

Referring now to FIG. 2 there is illustrated a block diagram showing the configuration of the plucking pulse generator 22. This generator contains a plucking enable circuit 30 which outputs a signal EN-PLUCK at its output 32 every time the amplitude of the RF oscillation signal HF1 drops below a predefined value. This plucking enable circuit 30 prevents a plucking pulse being applied to the resonant circuit as long as the amplitude of the RF oscillations is still sufficient to permit the clock generator 26 to generate a usable clock signal HFCLK. It is not until the amplitude of the HF oscillations has dropped to such a extent that any further drop would no longer permit generation of a satisfactory clock signal, that the plucking enable circuit 30 furnishes the signal EN-PLUCK as an indication to the subsequent circuit modules that a plucking pulse can be applied to the resonant circuit 12 when the aforementioned further condition is satisfied, namely that the momentary value of the RF oscillation signal HF1relates to the reference voltage as predefined. This reference voltage is generated via the reference voltage and plucking pulse generator 34 which also "sees" the existence of the predefined relationship and furnishes the pulse PLUCK.

The reference voltage is generated by charging a capacitor by means of a current source. The momentary value of the RF oscillations in this arrangement is compared to this increase in the reference voltage in every cycle of the oscillation; as soon as the difference between the reference voltage and the momentary value has attained a predefined difference the generator 34 outputs the pulse PLUCK as long as the signal EN-PLUCK has been generated prior. Simultaneously in "seeing" that the predefined relationship is satisfied, i.e. that the cited voltage difference exists, the generator 34 furnishes at its output 36 the signal PEAK which is supplied to a counter circuit 38. Outputting the pulse PLUCK results in the switch 24 being closed and energy supplied to the resonant circuit 12. The resonant circuit 12 thus re-oscillates at its full amplitude and thus the signal ENPLUCK no longer appearing at the output 32 of the plucking enable circuit 30. Although in the course of subsequent cycles of the RF oscillation signal HF1 the cited difference between the reference voltage and each momentary value may be greater than a predefined value, so that the signal PEAK is output each time at output 36, this does not result in output of the pulse PLUCK since, as already mentioned, there is no signal EN-PLUCK.

The counter circuit 38 contains a two-stage binary counter and a logic circuit resulting in this counter circuit reacting in a specific way, i.e. by the count of the binary counter being decremented on every clock pulse of the clock signal HFCLK when there is a signal PEAK, and incremented on every clock pulse when there is no signal PEAK. At the same time the logic circuit ensures that in decrementing, the count is no longer changed once having attained the binary value 00 and that in incrementing, the count is no longer changed once having attained the binary value 11. The counter circuit 38 comprises two outputs 40 and 42 for outputting the signals Q0 and Q1. These signals are applied to the inputs 44 and 46 respectively of the reference voltage and plucking pulse generator 34 where they result in switching of the current source used in generating the reference voltage. As already mentioned, the reference voltage is generated at a capacitor which is charged by a supply of current. The reference voltage thus rises, the slope of which can be varied by the Signals Q0 and Q1 output by the counter circuit 38. The generator 34 and counter circuit 38 form a closed control loop, with the aid of which the slope of the reference voltage curve is varied each time so that in every half-cycle of the RF oscillations the difference between the reference voltage and the momentary value of the RF oscillations attains a predefined value. If the difference is greater than the predefined value, the current source used to charge the capacitor is switched so that the slope of the reference voltage curve is less steep, whilst when the difference is smaller than the predefined value, this slope is increased by correspondingly switching the current source. These functions will now be detailed in discussing the circuit diagrams of the circuit modules as contained in the plucking pulse generator 22 as shown in FIGS. 3 to 6 with reference to the signal diagrams as shown in FIG. 7.

Figure 3:
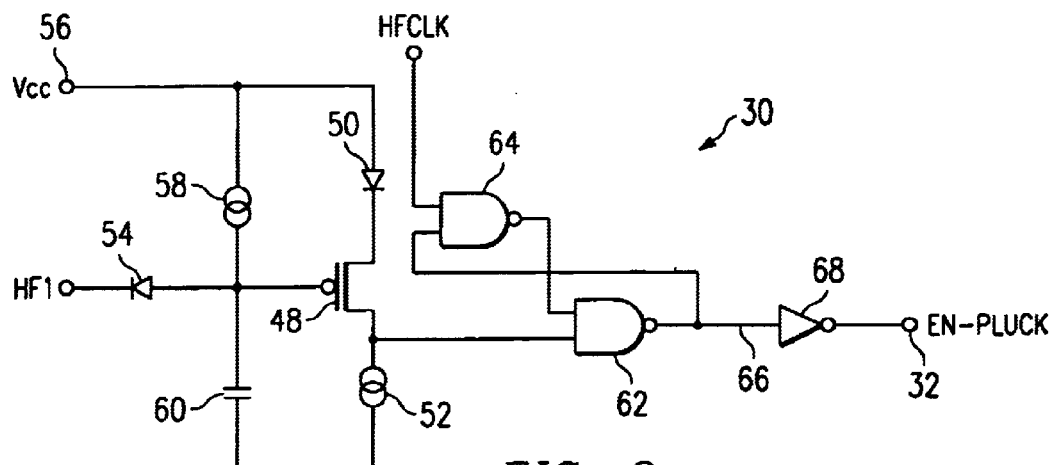
FIG. 3 is a circuit diagram of the plucking enable circuit as shown in FIG. 2.

Referring now to FIG. 3 there is illustrated the circuit diagram of the plucking enable circuit 30. This circuit contains a field-effect transistor 48 whose source is connected to the supply voltage Vcc via a diode 50 and between the drain and ground of which a current source 52 is connected. The gate of this field-effect transistor 48 receives the RF oscillation signal HF1 via a diode 54. Connected between the gate and the supply voltage terminal 56 is a further current source 58 which charges a capacitor 60 connected between the gate and ground. Connected to the drain of the field-effect transistor 48 is one input of a D flip-flop making use of two NAND circuits 62, 64 to the other input of which the clock signal HFCLK is applied. The output 66 of the D flip-flop is connected via a negator 68 to the output 32 of the plucking enable circuit 30.

The plucking enable circuit 30 serves to generate the signal EN-PLUCK enabling energy to be supplied to the resonant circuit 12 from the storage capacitor 20. The current source 58 results in the capacitor 60 being continually charged so that the voltage at the gate of the field-effect transistor 48 increases. At the same time this gate is discharged by the RF oscillation signal HF1 applied via the diode 54. A drop in the amplitude of the RF oscillations causes the charging voltage at the gate of the field-effect transistor 48 to increase until it finally attains a value corresponding to the value of the supply voltage Vcc less the threshold value of the field-effect transistor 48 and plus the forward voltage of the diode 50. Once this voltage value is attained, the field-effect transistor 48 if OFF so that a LOW signal is applied to the input of the NAND circuits 62, 64 connected to the field-effect transistor 48. This results in a HIGH signal appearing at the output 66 25 when the clock signal HFCLK is next HIGH which is negated by the negator 68 and appears as LOW signal EN-PLUCK at output 32. This plucking enable circuit 30 thus generates a LOW signal EN-PLUCK every time the amplitude of the RF oscillation signal HF1 has dropped below a predefined value.

Figure 4:
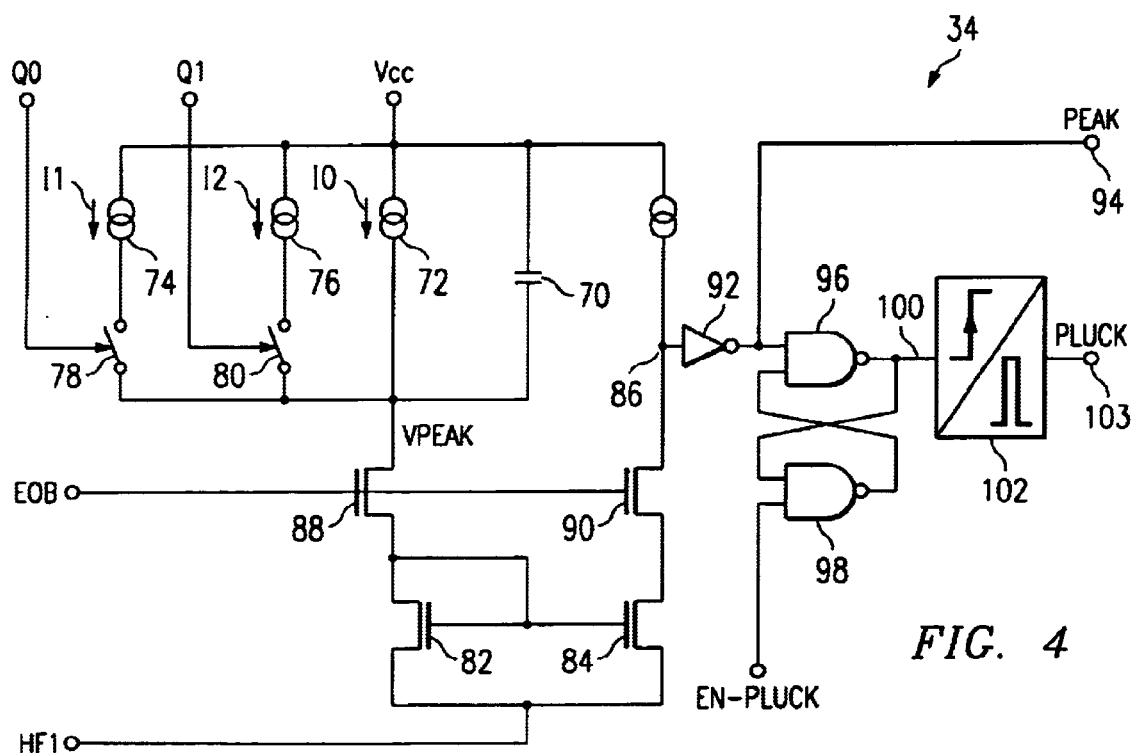
FIG. 4 is a circuit diagram of the reference voltage and plucking pulse generator as shown in FIG. 2.

Referring now to FIG. 4 there is illustrated the circuit diagram of the reference voltage and plucking pulse generator 34. To generate the reference voltage this generator contains a capacitor 70 and a current source 72 connected thereto in parallel which continually charges the capacitor 70 so that its charging voltage has a rising slope. This reference voltage is identified in FIG. 4 as VPEAK. As evident from this Figure two further current sources 74 and 76 are provided, each of which is switchable via a switch 78 and 80 respectively connected in parallel to the current source 72. In this arrangement the current sources are dimensioned so that the current source 72 and current source 74 each furnish the same current and thus: I0=I1 whilst current source 76 furnishes twice the value of the current furnished by current source 72 and thus I2=2I0. By correspondingly closing the switches 78 and 80 as controlled by the signals Q0 and Q1 the, capacitor 70 can be charged with the various currents I0, 2I0, 3I0 or 4I0. Depending on the level of the charging current, the slope of the reference voltage VPEAK is rendered less steep or steeper.

The generator 34 contains furthermore two field-effect transistors 82, 84 connected as a current mirror. This current mirror circuit has the effect that the current flowing through the field-effect transistor 82 also appears in the field-effect transistor 84 so that accordingly the same voltage appears at the circuit point 86 generated as the reference voltage VPEAK at the capacitor 70. The additional field-effect transistors 88 and 90 have simply the effect of disabling generation of the reference voltage when the EOB signal from the carrier end detector 28 indicates that the resonant circuit 12 receives a RF carrier oscillation signal. It is not until conclusion of this RF carrier oscillation signal that the field-effect transistors 88, 90 are switched on the signal EOB so that generating the reference voltage can occur.

Assuming now that switches 78 and 80 are open, then capacitor 70 is charged during the negative half-wave of the RF oscillation signal HF1 by the current source 72. As soon as the momentary value within a half-wave has attained a value corresponding to the difference between the reference voltage VPEAK and the threshold voltage Vt of the field-effect transistor 82, this transistor 82 is switched on. Due to the current mirror function field-effect transistor 84 is likewise switched on. The circuit point 86 goes low which after inversion by a negator 92 becomes a HIGH signal PEAK at the output 94. The PEAK signal is thus generated every time a predefined relationship between the reference voltage VPEAK and the momentary value of the RF oscillation signal HF1 exists, namely the relationship: momentary value of RF oscillation signal HF1 greater or equal to reference voltage VPEAK less threshold voltage Vt; as soon as this relationship exists, the field-effect transistor 82 is switched on. The signal PEAK is applied to an input of a D flip-flop making use of two NAND circuits 96, 98 which always change state when the signal EN-PLUCK is applied to its other input. This signal EN-PLUCK presets the flip-flop 96, 98 which then change state due to the signal PEAK. Further signals PEAK result in no change in state of the flip-flop 96, 98; it not being until the signal EN-PLUCK is again applied that a further signal PEAK changes the state of the flip-flop 96, 98. The signal edge occurring at the circuit output 100 when the flip-flop 96, 98 is gated is differentiated in a module 102 and shaped into a spike which is output as the pulse PLUCK at the output 103. As shown in FIG. 1, this signal results in the switch 24 being closed to thus pluck the resonant circuit 12.

Figure 5:
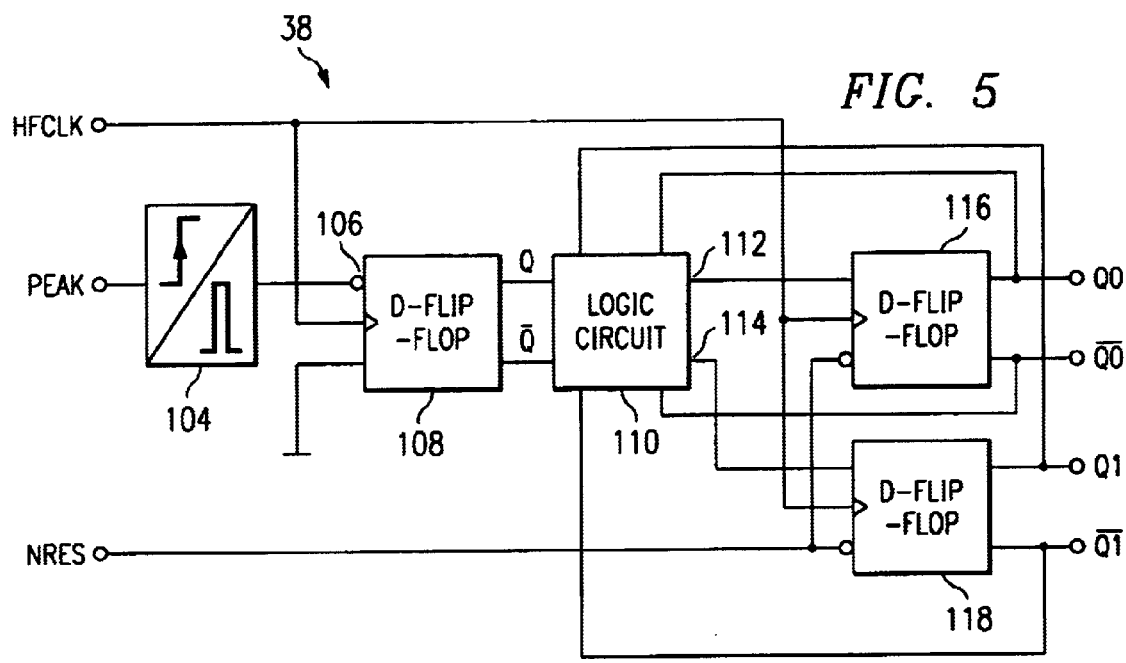
FIG. 5 is a circuit diagram of the counting circuit as shown in FIG. 2.
Figure 6:
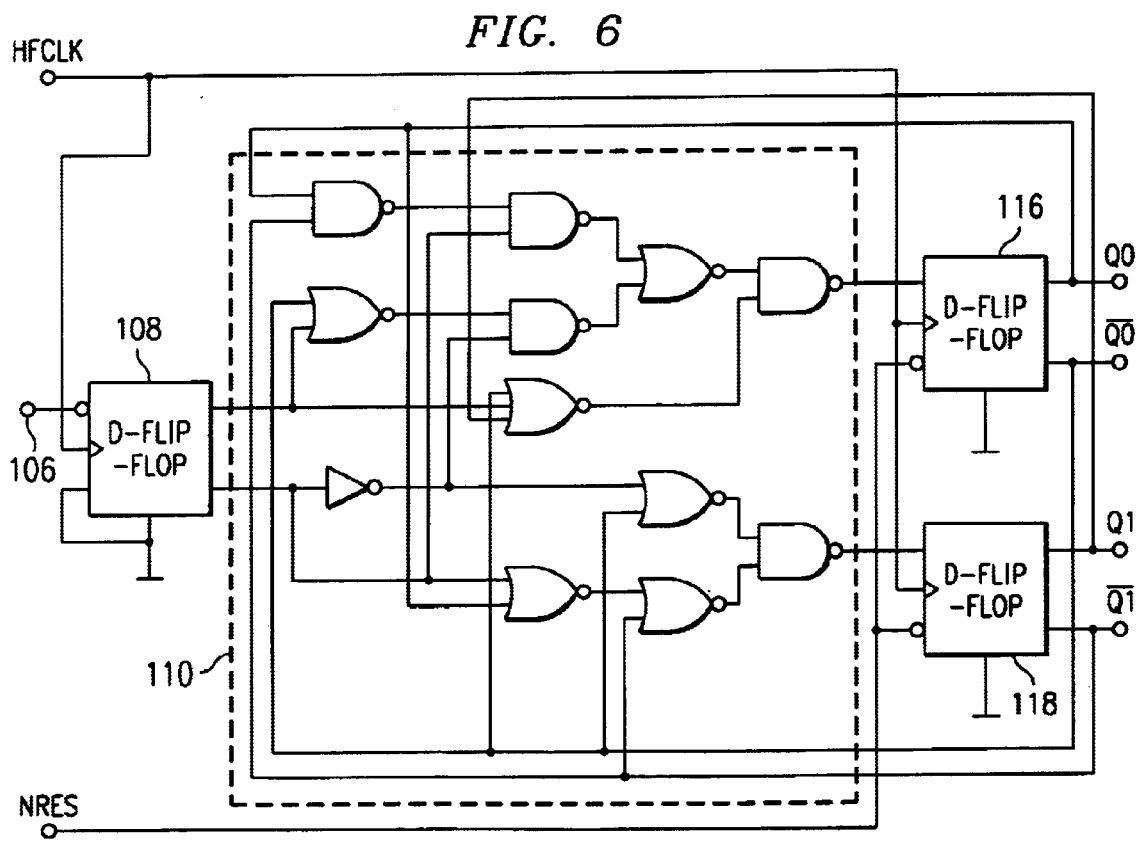
FIG. 6 is a circuit diagram of the logic circuit contained in the counting circuit as shown in FIG. 4.
Figure 7A:
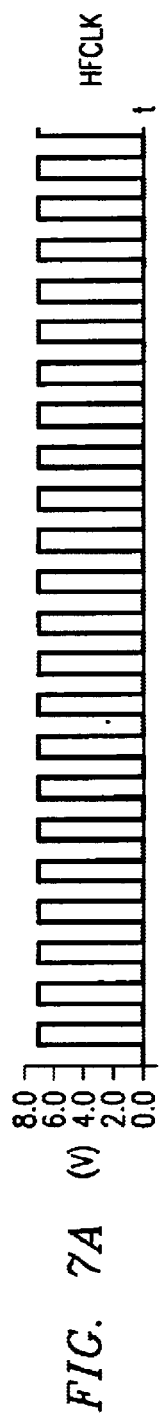
FIG. 7 is a signal diagram assisting in discussing the signal occurring in the circuit assembly in accordance with the invention.
Figure 7B:
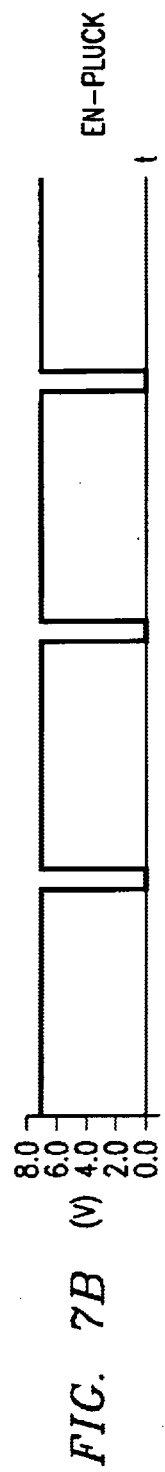
Figure 7C:
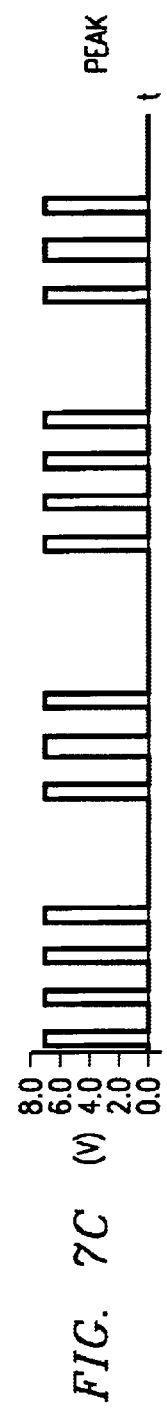
Figure 7D:
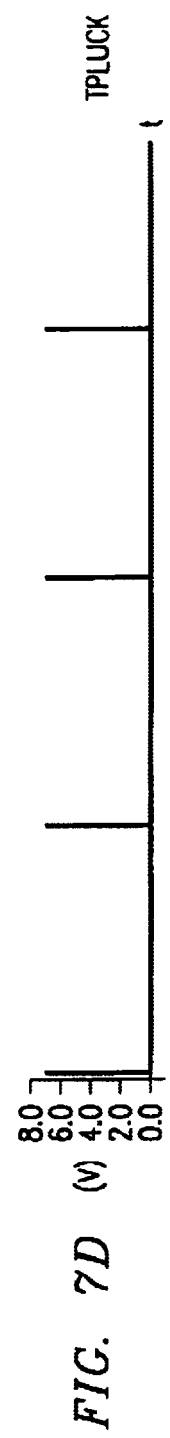
Figure 7E:
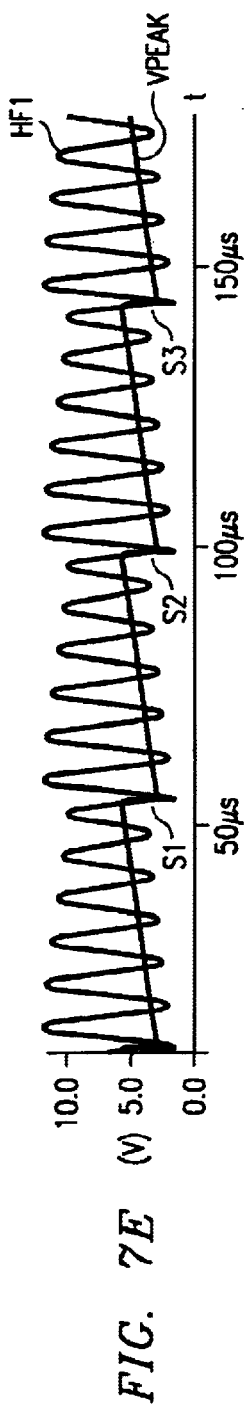

Referring now to FIG. 5 there is illustrated the circuit diagram of the counter circuit 38. In this counter circuit the signal PEAK is reshaped by differentiation and shaping in the circuit module 104 into a spike which is applied to the preset input 106 of a D flip-flop 108. The output signals Q and Q of the D flip-flop 108 are applied to a logic circuit 110 whose configuration is shown in FIG. 6. The signals at the outputs 112 and 114 of the logic circuit 110 control a two-stage up/down counter consisting of two D flip-flops 116 and 118 whose output signals Q0, Q1 can assume in sequence the binary values 0,0 or 0,1 or 1,0 or 1,1. As evident from FIG. 5 the outputs of the D flip-flops 116 and 118 are returned to the logic circuit 110 so that these generate their output signals at the outputs 112 and 114 depending on the count in each case. As already mentioned above, this logic circuit has the effect that the counter is driven into "saturation" in both up/down counting, i.e. counting up to binary count 11 and down to binary count 00 even when further count pulses are received. The logic circuit 110 as shown in FIG. 6 exclusively contains logic modules such as NAND gates, NOR gates and a negator so that its function in detail is immediately apparent to the person skilled in the art. With the aid of the signal NRES the counter can be set to a defined starting count.

Assuming now that the starting count of the counter is the binary value 11, then every time the signal PEAK occurs, the count is reduced by one step in synchronism with the clock signal HFCLK. This occurs until the binary count 00 is attained, the logic circuit then causing this count to be no longer changed even if further signal PEAK occur, whereas, when the reference voltage and plucking pulse generator 34 outputs no further signal PEAK, then in synchroism with the clock signal HFCLK the logic circuit 110 causes the count to be incremented by each value on every clock pulse until the binary count 11 is reattained. The logic circuit 110 then has the effect that no further change in count occurs, even if no further signals PEAK occur. It is these various counts in the generator 34 that result in the switches 78 and 80 being opened and closed which, as already explained, produce a change in the raising slope of the waveform of reference voltage VPEAK.

Referring now to FIG. 7 there are illustrated in the diagrams A to E the signals HFCLK, EN-PLUCK, PEAK, PLUCK, the RF oscillations HF1 and the reference voltage VPEAK, it being particularly the waveforms of the reference voltage VPEAK which is important, since it is the one which with the aid of the circuit described makes the change in the sense of optimizing plucking the oscillations of the resonant circuit 12. When the transponder as shown in FIG. 1 receives a RF carrier oscillation signal, and this signal ends, then the resonant circuit 12 first oscillates at the full amplitude. However, this amplitude quickly decreases more or less depending on the Q as evident from FIG. 7 for the signal HF1. Since at the start of the RF oscillations the difference between the reference voltage VPEAK and the momentary value of the RF oscillations in several negative half-waves in sequence is greater than the threshold voltage Vt of the field-effect transistor 82, a signal PEAK occurs during each half-cycle as is evident at C in FIG. 7. With each signal PEAK the count of the counter 116, 118 initially standing at 11 is decremented by one count. Due to the initially existing binary values 1 of the two signals Q0 and Q1, the switches 78 and 80 are closed so that the capacitor 70 is charged with the current as maximally available, resulting in the raising slope of the reference voltage VPEAK being a maximum. When the count is decremented by one due to the first signal PEAK, switch 78 is opened by the signal Q0, resulting in less current being available for charging the capacitor 70 and thus a reduction in the slope of the signal PEAK. On the next signal PEAK the count of the counter 116, 118 is again decremented by one count so that due to the signal Q0 the switch 78 is again closed, whilst due to the signal Q1 switch 80 is opened. This results in a further reduction in the charging current of the capacitor 70 and thus in a further reduction in the slope of the reference voltage VPEAK. This reduction in the slope on each signal PEAK is clearly evident at E in FIG. 7. Once the condition for generating the signal PEAK has been satisfied four times, the amplitude of the RF oscillations HF1 has been reduced to such an extent that the transistor 82 is no longer signalled ON, so that accordingly no further signal PEAK is generated. It is this absence of the signal PEAK that results in the count of the counter 116, 118 being incremented by one count on each further pulse of the clock signal HFCLK. This then results in switches 78, 80 being opened and closed in the reverse sequence so that the slope of the curve of the reference voltage VPEAK increases on every clock pulse in the absence of the signal PEAK.

However, with time, the amplitude of the RF oscillations HF1 is likewise reduced and as soon as the threshold as established in the plucking enable circuit 30 is no longer attained, the signal EN-PLUCK as shown in FIG. 7 at B is generated LOW. As evident at E in FIG. 7 the condition for generating the signal PEAK is again attained at the point in time S1 due to the increased slope of the reference voltage VPEAK, namely the condition that the difference between the momentary value of the RF oscillation HF1 and the reference voltage VPEAK attains the threshold voltage Vt of the field-effect transistor 82, this again results in the signal PEAK being generated. Since the flip-flop 94, 98 has been preset by the signal EN-PLUCK, it is reset by the signal PEAK. The edge of the output signal of the flip-flop 94, 96 is differentiated and shaped in the circuit module 102 so that at the output 103 the signal PLUCK occurs which results in energy being supplied to the resonant circuit 12 by the switch 24 being closed. This occurs at the point in time S1 in diagram E of FIG. 7. As evident, the amplitude of the RF oscillations HF1 immediately reassumes the maximum value and also the reference voltage VPEAK returns to its original starting value.

The action as described is repeated multiply, whereby due to the signal PEAK generated in each period of the sequence, the slope of the reference voltage VPEAK is first reduced and then increased in the absence of the signal PEAK, until in the end a new PLUCK pulse is generated when the signal EN-PLUCK appears at the points in time S2 and S3.

Since the energy in the storage capacitor 20 is thereby reduced, of course, these actions can only be repeated as long as sufficient energy is available for sustaining, or plucking, the oscillations of the resonant circuit 12.

Due to the slope of the reference voltage VPEAK being changed on the basis of an on-off control loop, optimum adaptation to the Q of the resonant circuit 12 in each case and to any externally effective damping factors is achieved, i.e. avoiding energy being supplied too early to the resonant circuit 12 and thus the energy existing in the storage capacitor 20 being consumed prematurely. A transponder incorporating a circuit assembly as described can be put to use in a wealth of applications without requiring any special consideration of the individual conditions possibly having a negative effect on the oscillation response of the resonant circuit.

What is claimed is:

1. A circuit assembly for generating pulses sustaining or "plucking" RF oscillation in a resonant circuit of transponder having no battery power supply in which a supply voltage needed for its operation is obtained from a RF carrier oscillation pulse defined in time exciting the resonant circuit into oscillation and used to charge a storage element whose charging voltage forms the supply voltage, in which a sustaining or plucking pulse is generated every time the amplitude of the RF oscillation drops below a defined threshold value and its momentary value is in a defined relationship to a reference voltage changing in time as the charging voltage of a capacitor and wherein a switch is provided which can be switched on for the duration of the plucking pulse for connecting a storage capacitor to the resonant circuit, characterized in that a closed control loop (34, 38) is provided which varies the slope of the reference voltage curve between two plucking pulses (PLUCK) in the direction of maintaining the defined relationship between the momentary value of the RF oscillation (HF1) and the reference voltage (VPEAK).

2. The circuit assembly as set forth in claim 1, characterized in that the closed control loop contains a threshold switch (82) to which the difference between the momentary value of the RF oscillation (HF1) and the reference voltage (VPEAK) is applied and which changes its switching condition and generates an enable signal (PEAK) when the difference attains the defined relationship, that the closed control loop further contains a counter circuit (38) to which an enable signal (EN-PLUCK) is applied and which as controlled by the clock pulses (HFCLK) derived from the RF oscillation (HF1) increments its count on every clock pulse when no enable signal (PEAK) is present and decrements its count when the enable signal is present, and that a current supplied to the capacitor (70) for generating the charging voltage serving as its reference voltage is varied as a function of each count of the counter circuit (38).

3. The circuit assembly as set forth in claim 2, characterized in that the counter circuit (38) contains a two-stage up/down counter (116, 118) and a logic circuit (110) which prevents a change in the count of the up/down counter (116,118) on every clock pulse when the highest and lowest count is attained, even in the absence or presence of enable signals (PEAK).

* * * * *